Apr. 3, 1923.
P. S. FRICK ET AL
1,450,770
SANITARY SELF CLEANING FILTER
Original Filed Feb. 17, 1919
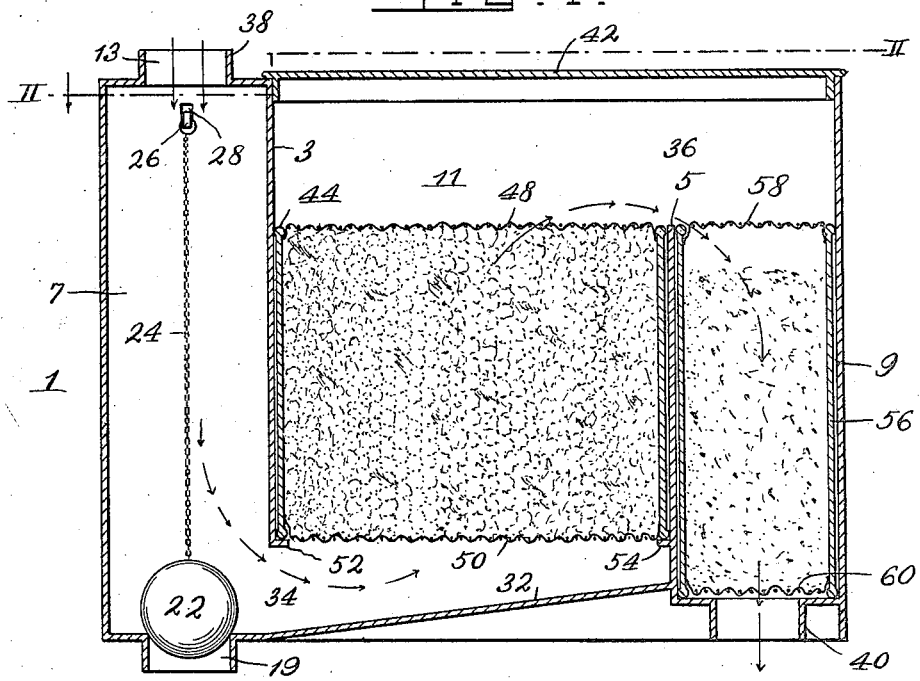
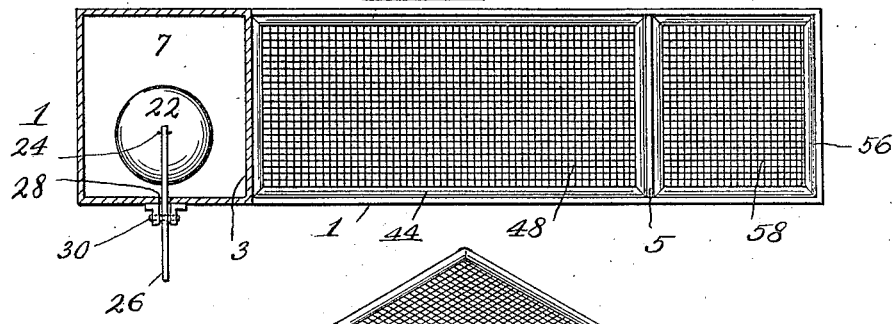
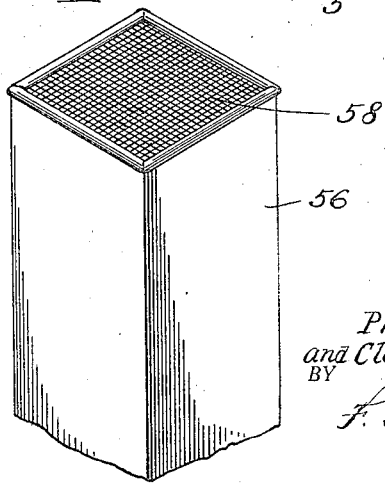
WITNESS:
L. J. Fischer
INVENTOR.
Phillip S. Frick,
and Claude E. Robinson,
BY
F. G. Fischer,
ATTORNEY.

Patented Apr. 3, 1923.

1,450,770

UNITED STATES PATENT OFFICE.

PHILLIP S. FRICK AND CLAUDE E. ROBINSON, OF OSWEGO, KANSAS.

SANITARY SELF-CLEANING FILTER.

Application filed February 17, 1919, Serial No. 277,529. Renewed September 7, 1922. Serial No. 586,804.

*To all whom it may concern:*

Be it known that we, PHILLIP S. FRICK and CLAUDE E. ROBINSON, citizens of the United States, residing at Oswego, in the county of Labette and State of Kansas, have invented certain new and useful Improvements in Sanitary Self-Cleaning Filters, of which the following is a specification.

Our invention relates to improvements in filters and one object is to provide a simple, inexpensive and efficient device of this character whereby impurities in rain water are removed as it flows from a roof to a cistern.

A further object is to provide a filter which can be readily drained after each rain, so that water need not remain therein to grow stagnant and render said filter unsanitary.

Another object is to provide a filter from which the filtering agents can be readily removed for purification or replacement as needed.

Another object is to provide a filter in which all of the internal parts are concealed within a container to protect them from being tampered with. Other objects will hereinafter appear, and in order that said invention may be fully understood, reference will now be made to the accompanying drawing, in which:

Fig. 1 is a vertical sectional view of a filter constructed in accordance with our invention.

Fig. 2 is an irregular, horizontal plan view on line II—II of Fig. 1.

Fig. 3 is a broken detail perspective view of a receptacle for holding a suitable filtering agent.

In carrying out the invention, we employ a rectangular housing or container 1, divided by vertical partitions 3 and 5 into an inlet duct 7, an outlet duct 9, and a chamber 11 intermediate said ducts.

The inlet duct 7 is provided at its upper and lower ends with inlet and outlet ports 13 and 19, respectively. The outlet port 19 is normally closed by a valve 22 connected to the lower end of a chain 24, the upper end of which is connected to a lever 26 extending outwardly through a slot 28 in one side of the duct 7 and mounted upon a pivot 30.

The chamber 11 has an inclined bottom 32 extending downwardly to the port 19 for carrying off all water within said chamber 11 when the valve 22 is opened. The chamber 11 communicates with the lower portion of the duct 7 through an opening 34 below the partition 3 and with the upper portion of the outlet duct 9 through an opening 36 above the partition 5. The inlet duct 7 is provided at its upper end with a collar 38 and the outlet duct 9 is provided at its lower end with a collar 40 for connection with a downspout (not shown).

That portion of the container 1 above the chamber 11 and the outlet duct 9 is normally closed by a cover 42 which is removable, so that access may be had to the interior of said container.

44 designates a receptacle removably arranged within the chamber 11 and adapted to hold charcoal or other filtering agents. The top and bottom 48 and 50, respectively, of said receptacle 44 consist of wire screens or other elements having openings which permit the ready passage of water therethrough, but are too fine to allow the filtering agent to pass. As disclosed by Fig. 1, the receptacle 44 is supported above the inclined bottom 32 of the chamber 11 by flanges 52 and 54 on the partitions 3 and 5, respectively.

56 designates another receptacle which is smaller but of similar construction to the receptacle 44, it being provided at its top and bottom with screens or other perforated elements 58 and 60, respectively, which permit the passage of water therethrough, but retain the filtering agent which consists of tripoli or other suitable materials.

In practice, the collars 38 and 40 are connected to a down-spout leading from a roof to a cistern (not shown), so that rain water in passing through said spout must also pass through the filtering agents within the receptacles 44 and 56. After each rain all of the water left within the container 1 is drained therefrom by the operator raising the valve 22 through the intermediacy of the cable 24 and the lever 26. As the water flows backwardly through the filtering agent in the receptacle 44 and through the port 19, it carries a great many impurities therewith and thus obviates the necessity of frequently cleansing or replacing the filtering agent within said receptacle 44. Should it become necessary at any time to replace or cleanse the filtering agents in the receptacles 44 and 56 said receptacles can be readily taken out with their contents after the cover 42 has been removed from the top of the container 1.

From the foregoing description, it is apparent that we have produced a filter embodying all of the advantages above-mentioned, and while we have shown and described the preferred form of our invention, we reserve the right to make such changes in the construction, combination and arrangement of parts as properly fall within the spirit and scope of the claim.

Having thus described our invention, what we claim and desire to secure by Letters Patent, is:

A filter consisting of a container having an inlet at one end, an outlet at its opposite end, and an inclined bottom portion, an imperforate partition adjacent the inlet and extending downwardly to a point adjacent the bottom of the container, a second imperforate partition adjacent the outlet and extending upwardly to a point adjacent to the top of the container, a removable receptacle for filtering material having screened top and bottom portions and supported above the inclined portion of the bottom of the container by the partitions, a second removable receptacle for filtering material having screened top and bottom portions and disposed between the second partition and the adjacent end of the receptacle, and a removable cover for the container to permit access to the removable receptacles, for the purpose set forth and described.

In testimony whereof we affix our signatures, in the presence of two witnesses.

PHILLIP S. FRICK.
CLAUDE E. ROBINSON.

Witnesses:
  R. W. SLANE,
  CLARENCE SCHMIDT.